United States Patent [19]

Lahr et al.

[11] 4,209,399

[45] Jun. 24, 1980

[54] PROCESS FOR THE WORKING UP AND REGENERATION OF WASH WATERS CONTAINING AMMONIUM

[75] Inventors: Helfried Lahr, Karlsdorf-Neuthard; Günter Krug, Bruchsal, both of Fed. Rep. of Germany

[73] Assignee: Deutsche Gesellschaft fur Wiederaufarbettung von Kernbrennstoffen GmbH, Hanover, Fed. Rep. of Germany

[21] Appl. No.: 888,703

[22] Filed: Mar. 20, 1978

[30] Foreign Application Priority Data

Mar. 22, 1977 [DE] Fed. Rep. of Germany ....... 2712462

[51] Int. Cl.$^2$ .................................................. G21F 9/08
[52] U.S. Cl. ........................................ 210/59; 210/66; 210/71; 252/301.1 W; 134/13; 134/29; 134/30; 423/189
[58] Field of Search ................. 210/48, 59, 60, 65–67, 210/70, 71; 252/301.1 W; 134/13, 28–30; 423/189, 186, 187

[56] References Cited

U.S. PATENT DOCUMENTS

| | | | |
|---|---|---|---|
| 2,878,146 | 3/1959 | Certa | 134/41 |
| 3,873,362 | 3/1975 | Mihram et al. | 134/13 |
| 4,072,501 | 2/1978 | Quinby | 252/301.1 W |

FOREIGN PATENT DOCUMENTS

2450690  5/1975  Fed. Rep. of Germany ... 252/301.1 W
2629581  1/1978  Fed. Rep. of Germany ... 252/301.1 W

*Primary Examiner*—Benoit Castel
*Attorney, Agent, or Firm*—Sprung, Felfe, Horn, Lynch & Kramer

[57] ABSTRACT

A process for regenerating an ammonium, heavy metal salts, ammonium nitrate and organic substances containing wash water resulting from the production of a hydrated oxide of an actinide which comprises evaporating said wash water to a concentration of at least 900 grams per liter salt and scrubbing the resulting $CO_2$-containing vapors with hot alkali lye prior to their condensation.

13 Claims, No Drawings

PROCESS FOR THE WORKING UP AND REGENERATION OF WASH WATERS CONTAINING AMMONIUM

BACKGROUND OF THE INVENTION

1. Field of the Invention

This invention relates to the regeneration of ammonium-containing wash waters resulting from the production of hydrated oxide particles of actinides. More especially this invention relates to a process for obtaining regenerated wash waters free of ammonium nitrate and organic substances, carbonate and heavy metals which can be reused, optionally after replenishment of the ammonium content, to wash out precipitated chemicals used for precipitation and by-products resulting from the production of nuclear fuel or breeder materials.

2. Discussion of the Prior Art

It is known that during the production of nuclear fuels or breeder materials hydrated oxide particles are precipitated from salt solutions, especially nitrates of uranium, plutonium and thorium, by hydrolysis. This process is oftentimes triggered by the decomposition of hexamethylene tetramine by heat and sometimes involves the addition of stabilizing agents such as urea. The chemicals used for the precipitation and the by-products of the reaction must be removed from the actinide hydrate oxide particles prior to further processing. It is known to wash the particles with water containing 2 to 3 percent of ammonia. After repeated use of wash water, it will contain small amounts of heavy metal salts in addition to larger amounts of ammonium nitrate and organic substances. The ammonium solutions contain also carbonate from the air and from the disintegration of the organic substances. Therefore before recycling the wash water also must be free from the carbonate, because these will dissolve the actinide particle fuel.

It is an object of the present invention, therefore, to regenerate these wash waters to remove the salts of heavy metals. It is a further object of this invention to regenerate the wash waters so that they are free of the large amounts of inactive salts and carbonate. It is a further object of this invention to regenerate the wash waters so that they can be recycled for use optionally after the replenishment of their ammonium content. A fourth object of this invention is to produce as less as possible radioactive waste.

SUMMARY OF THE INVENTION

In accordance with the desideratum set forth above there is provided, in accordance with the invention, a process for the regeneration of the loaded wash waters resulting from the production of hydrated oxide gels of actinides which comprises evaporating said wash waters to a concentration of at least 900 grams per liter salt and scrubbing the resultant $CO_2$-containing vapors prior to their condensation with hot alkali lye.

In accordance with this invention it has been discovered that wash waters can be regenerated to be free of radioactive products and other inorganic and organic substances. If the loaded wash waters are evaporated to a concentration of more than 900 grams per liter of salt, preferably more than 1,000 grams per liter of salt and the resulting $CO_2$-containing vapors from the evaporation are scrubbed with a hot alkali lye, one obtains thereby a carbonate-free regenerate which, after optional replenishment of the ammonium content, can be used again for the scrubbing of hydrated oxide particles. The treatment with the hot alkali lye is preferably performed at a temperature between 95° C. and 115° C. more preferably about 105° C. During this hot alkali lye treatment, of course a portion of the alkali is transformed into the corresponding carbonate by the $CO_2$-containing vapors.

Preferably, as the alkali lye, a sodium hydroxide solution is employed. This sodium hydroxide solution preferably has a strength of 25 to 35% by weight, more especially about 30% by weight. As indicated above, during the scrubbing process it gradually changes to a sodium carbonate solution. It is the carbonate containing wash waters which are effective to dissolve the oxide hydrate particles so as to insure that the resulting waters, when condensed, are virtually free of carbonate before recycling.

As a result of the scrubbing of the evaporate with the alkali lye, there is obtained a soda solution having a concentration of about 40%. This resultant solution containing traces of alkali lye can be evaporated employing a wiper blade evaporator to dryness. The resultant solid alkaline component, e.g., soda with traces of the corresponding solution is therefore the only waste product from the process, in addition to filter materials mentioned below.

The wash waters are concentrated to a residual solution having more than 900 grams per liter of salt, preferably more than 1,000 grams salt per liter. These salts are mostly ammonium nitrate and organic residues in addition to small amounts of heavy metal salts.

It has been discovered in accordance with another embodiment of this invention that in a second vessel the inorganic and organic components can be removed from this residue by introducing therein concentrated nitric acid especially nitric acid having a concentration of between 60 and 65% by weight, preferably about 65% by weight. It is thereafter heated to a temperature greater than 100° C. preferably more than 105° C. causing disintegration of ammonium nitrate and other impurities, especially organic impurities, into gases such as carbon dioxide, nitrogen, and nitrogen oxides. These offgases are going through a filtering and washing unit to the atmosphere.

According to a further embodiment of the invention, the residue resulting from evaporation of the wash waters is mixed with nitric acid, repumped into the above mentioned second heating apparatus and additional concentrate resulting from evaporation of the wash waters is thus continuously added. Desirably, the reaction mixture flows in countercurrent to the offgases resulting from decomposition of the inorganic and organic residues. When a maximum volume in the vessel is obtained, the feed of nitric acid and wash water concentrate is interrupted. With suitable construction for the heating apparatus, the resulting solution can then be concentrated therein. With sufficient decontamination effect of the distilling unit, no radioactive waste results except, of course, for the filtering material employed.

It has still further been discovered that chlorides in amounts of less than 1.5%, preferably less than 1%, have a catalytic effect on the disintegration of the residues in the second step of the process and favorable influence the same. The salts remaining in solution following disintegration of the inorganic and organic impurities, especially the nitrates of the actinides, can be recycled as such or, following additional concentration, for production of heavy metal oxide hydrates particles.

What is claimed is:

1. A process for the regeneration of ammonium, heavy metal salts, ammonium nitrate and organic substances containing wash waters resulting from the production of hydrated oxide particle actinides which comprises evaporating said wash waters to a concentration of more than 900 grams salt per liter and scrubbing the resultant $CO_2$-containing vapors prior to their condensation with hot sodium hydroxide solution, the sodium hydroxide solution being of 20 to 35 percent by weight and having a temperature of between 95° and 115° C.

2. A process according to claim 1 wherein the evaporation of the wash waters is effected so that the resultant sump product contains more than 1000 grams per liter of salt.

3. A process according to claim 1 wherein the sodium hydroxide solution is 30% by weight.

4. A process according to claim 1 wherein the sodium hydroxide solution has a temperature about 105° C.

5. A process according to claim 1 wherein the residue of the wash waters remaining following said evaporation are thereafter reacted with concentrated nitric acid at a temperature of more than 100° C.

6. A process according to claim 5 wherein the residue of the remaining wash waters are reacted with nitric acid at a temperature of more than 105° C.

7. A process according to claim 5 wherein the residue of the evaporated wash waters are continuously added in a stream of hot nitric acid to a heating vessel and there is introduced thereto previously removed wash water concentrate and the resultant mass is permitted to digest to effect removal of gases which are removed from said heating vessel.

8. A process according to claim 5 wherein the nitric acid containing reaction mixture additionally contains a chloride in the amount of below 1.5%.

9. A process according to claim 8 wherein the chloride is present in an amount below 1% by weight.

10. A process according to claim 1 wherein the residue of the wash waters remaining following said evaporation is thereafter reacted with nitric acid of a concentration of between 60 and 65 percent by weight at a temperature of more than 100° C.

11. A process according to claim 10 wherein the nitric acid has a concentration of about 65%.

12. A process according to claim 10 wherein the residue of the evaporated wash waters is continuously added in a stream of hot nitric acid to a heating vessel and there is introduced thereto previously removed wash water concentrate and the resultant mass is permitted to digest to effect removal of gases which are removed from said heating vessel.

13. A process for the regeneration of ammonium, heavy metal salts, ammonium nitrate and organic substances containing wash waters resulting from the production of hydrated oxide particle actinides which comprises evaporating said wash waters to a concentration of more than 900 grams salt per liter, scrubbing the resultant $CO_2$-containing vapor prior to its condensation with hot sodium hydroxide solution, the sodium hydroxide solution being of 20 to 35 percent by weight and having a temperature between 95° and 115° C. and reacting the residue of the wash waters remaining following the evaporation with concentrated nitric acid at a temperature of more than 100° C.

* * * * *